US011909795B1

(12) United States Patent
Teng

(10) Patent No.: US 11,909,795 B1
(45) Date of Patent: Feb. 20, 2024

(54) INPUT SWITCHING FOR STREAMING CONTENT

(71) Applicant: Amazon Technologies, Inc., Seattle, WA (US)

(72) Inventor: Tianbing Teng, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 16/694,922

(22) Filed: Nov. 25, 2019

(51) Int. Cl.
*H04L 65/612* (2022.01)
*H04N 21/845* (2011.01)
*H04L 65/80* (2022.01)
*H04L 65/70* (2022.01)

(52) U.S. Cl.
CPC .......... *H04L 65/612* (2022.05); *H04L 65/70* (2022.05); *H04L 65/80* (2013.01); *H04N 21/8456* (2013.01)

(58) Field of Classification Search
CPC ... H04L 65/4084; H04L 65/607; H04L 65/80; H04N 21/8456
USPC .......................................... 709/231
See application file for complete search history.

(56) References Cited

U.S. PATENT DOCUMENTS

| 2009/0307367 | A1* | 12/2009 | Gigliotti | H04L 67/02 709/231 |
| 2010/0223392 | A1* | 9/2010 | Pond | H04N 21/6405 709/231 |
| 2015/0120957 | A1* | 4/2015 | Yun | H04L 65/60 709/231 |
| 2016/0295539 | A1* | 10/2016 | Atti | H04L 65/608 |
| 2019/0013028 | A1* | 1/2019 | Atti | G10L 19/24 |
| 2020/0204849 | A1* | 6/2020 | Loheide | H04N 21/26208 |

* cited by examiner

*Primary Examiner* — Nicholas R Taylor
*Assistant Examiner* — Chong G Kim
(74) *Attorney, Agent, or Firm* — Knobbe, Martens, Olson & Bear, LLP

(57) ABSTRACT

A content streaming system and methodology for facilitating the management of content streaming. A content delivery service receives at least an original content stream and multiple input contents from an original content provider. Additionally, the content delivery service processes the received input content streams, buffers the original and supplemental input content streams, and switches between the available input content streams for seamless and fast broadcasting. The decision to switch between a second content and a third is determined by an indication that a third input content is available in the buffer.

22 Claims, 7 Drawing Sheets

INPUT SWITCHING FOR STREAMING CONTENT

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service. As with content providers, content delivery service providers also provide requested content to client computing devices often with consideration of efficient transmission of the requested content to the client computing device or consideration of a cost associated with the transmission of the content. Accordingly, content delivery service providers often consider factors such as latency of delivery and resource allocation in providing requested content. For streaming content delivered by a content delivery service, content delivery services attempt to provide the stream content while trying to minimize latencies or delays that result in interrupted rendering of the content, such as jitter, artifacts or other lag effects.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
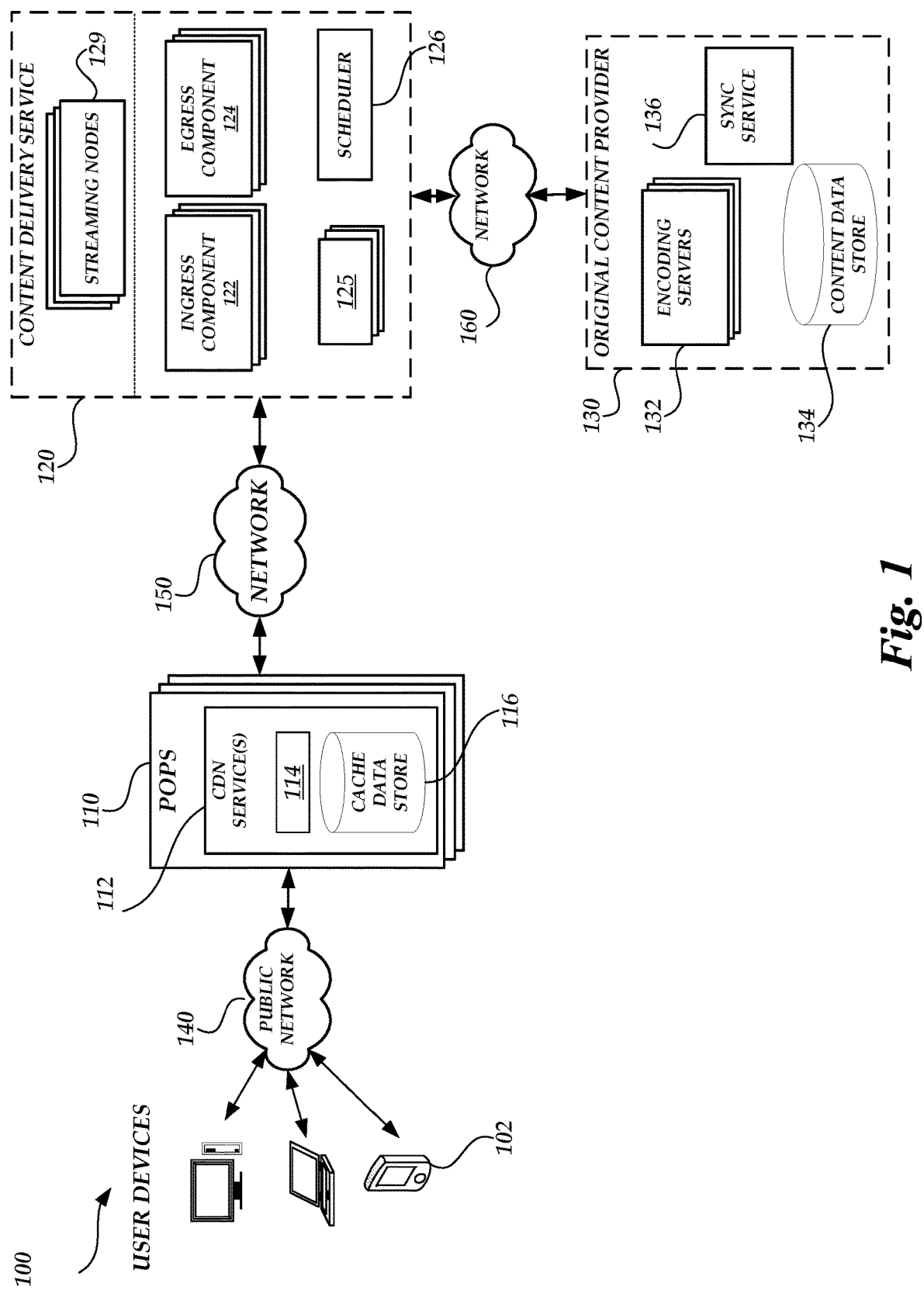
FIG. 1 is a block diagram of a content delivery environment that includes one or more user devices, a content delivery service and an original content provider according to one embodiment.

Generally described, content providers can provide content to requesting users. With regard to video content, a content provider can implement a content delivery service that is able to deliver video content to requesting users. Illustratively, a content delivery service indexes a collection of source video content (either live streaming or file-based video-on-demand) and processes it for delivery clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a content delivery service can also provide advanced video transmission features such as just-in-time packaging of video content, digital rights management ("DRM") encryption, time-shifting, bitrate selection, catch up TV, and more.

In some embodiments, to deliver content, content providers can organize individual content streams, such as a video file, into multiple segments that are then transmitted to requesting devices, segment by segment. For example, in a video stream, each segment typically accounts for 2-10 seconds of video rendered on a receiving device. To provide content to the content delivery environment, individual content segments can be encoded by an encoder and transmitted to the content delivery service. Traditionally, a single processing node on the content delivery service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are processed by the content delivery service, the content delivery service is available to receive and process requests for input content. More specifically, client computing devices, through a respective software application, can request individual video segments according to the available encoded bitrates and formats as published in the manifest file.

To receive input content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bit stream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, it is not uncommon for a content delivery service provider to maintain a single node or server, e.g., an ingress node, to receive incoming encoded content streams and decode the source encoded content for further processing. More specifically, the single node can operate as an ingress node to receive individual content streams or channels corresponding to source encoded segments encoded to a specific encoding profile (e.g., encoding bitrate and format). The individual content streams or channels are provided by an original content provider. The single node can utilize state information that facilitates determination that all encoding versions of the same encoded segment have been received Thereafter, the content provider can make unencoded content available to one or more egress nodes, or encoders, that can process the decoded source content into one or more of the encoded content versions that will be available to requesting users. In some implementations, the content provider can then make the encoded content available to a delivery service or set of nodes that establish individual communication channels with end users and send the encoded, streaming content to the end user upon request.

In some embodiments, the original content provider may transmit multiple input content streams to a content delivery service for delivery to the individual end users. More specifically, for an individual communication channel, the original content provider can transmit a first input content stream that is provided to the end user via the communication channel and then subsequently provide a second input content stream that can be processed (e.g., decoded). The original content provider can then provide some notification that can cause the content delivery service to switch between the two input content streams in each respective communication channels (or a subset thereof). For example, the original content provider can transmit a live input content stream of a sporting event and, as desired, periodically transmit supplemental content (e.g., advertisement) content streams and instructions to switch from the live content stream to the supplemental content stream. Illustratively, the input from the original content provider can be provided from a variety of sources or delivery mechanisms, including a media file on storage, a network input, or an input coming from video cables such as SDI (Serial Digital Interface), ASI, HDMI, or the like.

Generally described, switching between two input content streams consumes computing resources in the form of processing, memory and bandwidth resources for the encoding components of the content delivery service. To switch between a first content stream and a supplemental content stream, the content delivery service requires a threshold amount of time to complete the transmission of buffered input from a first input stream and the beginning of transmission of a supplemental input stream. Delays associated with switching between streaming content can inject additional latencies in completing the content delivery, leading to intermittent black screens, or divert processing resources that could have been utilized by a content delivery service to improve the quality or speed in the encoded content. For example, if the supplemental input content is not processed at the time a switch occurs (e.g., the content delivery service stops streaming the first input content), end users may not receive any content streams or partial content streams In addition to potential delays or inefficiencies associated with two content streams, in some embodiments, a content provider may provide a first content stream that will often correspond to a primary content stream (e.g., a live video stream). The content provider will then send two or more additional content streams, corresponding to supplemental content that are relatively shorter in length, such as a series of two or more advertisements. As described above, the original content provider may then instruct the content delivery service to switch between the first content stream and the first supplemental content stream, which requires a threshold amount of time to complete. If the second supplemental content is received within the threshold amount of time required to affect the first switch, the content delivery service may not prepare the second supplemental content for streaming. For example, processing received encoded content stream can include de-multiplexing (e.g., demuxing) the content, decoding/encoding the content, multiplexing, and displaying the content, etc. Accordingly, the content delivery service can experience additional delays or lag or inefficiently transmit content to users.

To address at least a portion of the inefficiencies described above with regard to processing input content from content providers, aspects of the present application corresponding to a content delivery service for managing streaming content are described. More specifically, the present disclosure focuses on aspects of the present application corresponding to the utilization of a content switching framework that facilitates the processing of a plurality of input content streams provided by an original content provider and switching between the plurality of content streams. In some embodiments, the content delivery service includes one or more ingress nodes to receive input content streams from an original encoded content provider. The content delivery service can then process the received input content streams and provide encoded content streams for delivery to end users, such as through a communication channel established by a delivery component of the content delivery service. For example, the input content stream can be demuxed and buffered in a manner that allows for the delivery of the input content for further downstream processing by the content delivery service in a more continuous manner to avoid artifacts, jitter or missing content.

Illustratively, the content delivery service can receive a second content stream, such as supplemental content, from the original content provider and an instruction to switch from the previously received content stream (e.g. the first content stream) and the received second content stream. The content delivery service can then process the second input content stream by demuxing and buffering the second received input content for delivery to create a standby channel and terminating the buffered content from the first content stream from a current channel. At this point, the buffered content from the first content stream from the current channel and the buffered content from the second content stream in the standby channel facilitate the switch in a more seamless manner.

In some embodiments, if at least one additional content stream (e.g. a third content stream), such as a second supplemental content is received from the original content provider, along with an instruction to switch from the previously received second content stream and the received third content stream, the content delivery service determines with the processing of the previously received switch from the first content stream and the second content stream is still using the current or primary channel with the first streaming content and the backup channel with the second streaming content. More specifically, the content delivery service can determine whether the length of the second content stream (e.g., the supplemental content) is sufficiently short such that the content stream will be completed in transmission before the length of time required to prepare the third content stream once the switch between the first and second content streams is completed.

By way of illustrative example, assume a first live network input of content at 60 frame per second (fps) has been processed and is being processed for transmission. While the first input is being processed for encoded, the system receives a second input content stream of a short duration, such as a clip of advertisements of five seconds in duration at 24 fps, with instructions to switch to the second received content in 15 seconds. Thereafter, the content delivery service receives a third video clip ads of five seconds at 24 fps with instructions to switch to the third video clip in 15 seconds. With only a single standby buffer, the content delivery system cannot begin buffering the third input stream.

In accordance with aspects of the present application, content delivery system can establish an additional standby channel with buffered content from the third content stream. Accordingly, once the switch is completed between first content stream and the second content stream, the content delivery service can have the third content prepared in a second standby channel and begin switching between the second and third content streams. By including additional standby channels, the content delivery service can mitigate the issue of successive supplemental content that would otherwise inject additional delays or inefficiencies.

Different input streaming may be encoded differently depending on such things as the input format, quality, resolution, etc. In some embodiments, the input content may be video, audio, data, text, images, animation, interactive content, or other types of multimedia content. Aspects of the present application will be described with regard to illustrative streaming content protocols, content lengths and specific examples. However, one skilled in the relevant art will appreciate that such aspects of the present application are not limited to the illustrative examples and that such examples should not be construed as limiting.

FIG. 1 illustrates a general content delivery environment 100 for delivering input content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a content delivery service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. Accordingly, communication times and capabilities may vary between the components of FIG. 1.

In accordance with embodiments, for purposes of illustration, the content delivery service 120 includes one or more servers for receiving content from original content providers 130 and processing the content to make available a set of received encoded bitrate segments, such as via a video packaging and origination service. The components of the content delivery service 120 may provide the encoded content to a separate stand-alone services, such as content delivery service, for subsequent transmission to user devices 102 or a CDN service 110. In other embodiments, the illustrated components of the content delivery service 120 may be integrated or form a part of a content delivery service environment. Accordingly, the term content delivery service 120 may be generally variable and is not limited to any particular implementation.

As described in further detail below, the content delivery service 120 includes a plurality of ingress components 122 utilized to receive encoded data streams from encoding servers 132 from content providers 130. Illustratively, the ingress components 122 can process the incoming encoded content from the original content providers 130. The content delivery service 120 also includes one or more egress components 124 encoding decoded content into a bitrate and format for delivery to user devices. The ingress components 122 and egress components 124 may be distributed according to geographic criteria or availability zones to facilitate delivery or access to encoded content. Additionally, although the ingress components 122 and egress components 124 are illustrated as separate components, in some embodiments, one or more computing device may be configured to implement the functionality associated with both the ingress components 122 and egress components 124.

The content delivery service 120 can further include management services or scheduler component 126 for managing the creation and switching of a current communication channel and a plurality of backup channels, as will be described herein. Still further, the content delivery service 120 can include a plurality of cache components 125 that maintain decoded input content in a primary, secondary and tertiary communication channel to facilitate switching between input content streams provided by the original content provider 130. The content delivery service 120 can further a plurality of streaming nodes 129 that correspond to a content delivery component for establishing individual communication channels with user device 102 and providing copies of the input content generated by the egress components 124. Each streaming node 129 can correspond to an individual user device 102, groupings of user devices 102 (e.g., by household or region), or combinations thereof.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices. Still further, aspects of the present application relate to the selection of individual ingress servers 122, egress servers 124 and cache components 125 based on attributes of the components, such as geographic information, logical network information, and the like. Accordingly, while such components are illustrated as logically being grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessary have all the same components or combination of components.

With continued reference to FIG. 1, the content delivery environment 100 also includes original content providers 130. Illustratively, the original content provider can include a plurality of encoders 132 for generating multiple input streams for transmission to the content delivery service 120. In one embodiment, individual encoders may generate different input versions of a content segment according to a different encoding profile. The original content provider 130 can also include logic or other management components for determining how many encoders 132 should be utilized or how to manage the addition or removal of encoders. In some embodiments, the original content provider 130 can further include synchronization services 136 for generating synchronization information utilized by the encoders, such as sequence numbers corresponding to the set of input segments, time stamp information related to a relative time of the input segments or from which relative time of input segments will be based, and the like. Additionally, illustratively, the encoding servers 132 or synchronization service 136 can generate notifications to the content delivery service 120 for switching between a plurality of input content streams as will be described herein.

Figure 2:
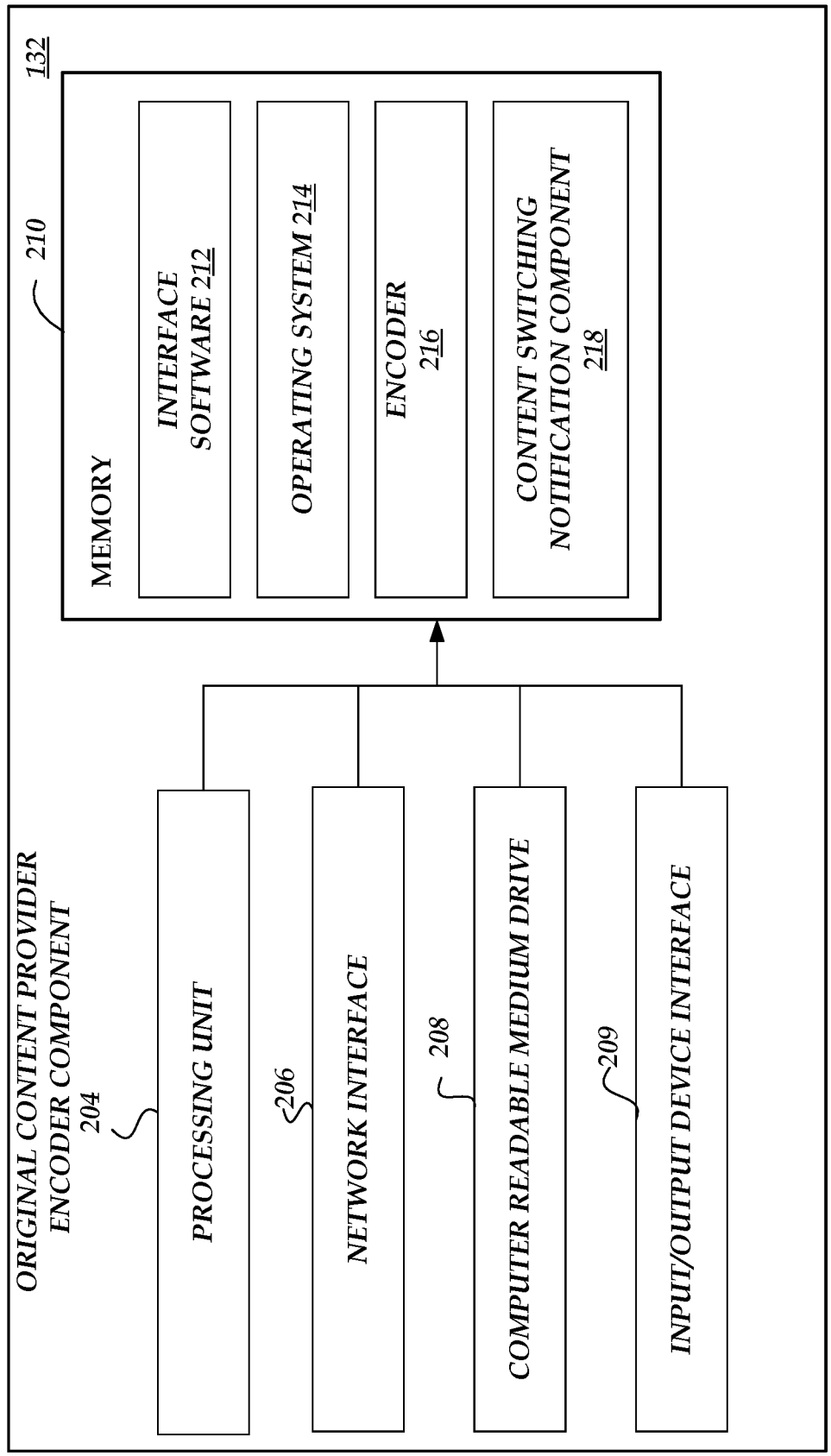
FIG. 2 is a block diagram of illustrative components of an encoder component configured to generate input content notifications in accordance with an illustrative embodiment.

FIG. 2 depicts one embodiment of an architecture of an illustrative original content provider encoder component for encoding content from an original content provider 130 as described herein. The general architecture of the encoder 132 depicted in FIG. 2 includes an arrangement of computer hardware and software components that may be used to implement aspects of the present disclosure. As illustrated, the encoder 132 includes a processing unit 204, a network interface 206, a computer readable medium drive 208, an input/output device interface 209, all of which may communicate with one another by way of a communication bus. The components of the encoder 132 may be physical hardware components or implemented in a virtualized environment.

The network interface 206 may provide connectivity to one or more networks or computing systems, such as the network 150 or network 160 of FIG. 1. The processing unit 204 may thus receive information and instructions from other computing systems or services via a network. The processing unit 204 may also communicate to and from memory 210 and further provide output information for an optional display via the input/output device interface 209. In some embodiments, the encoder 132 may include more (or fewer) components than those shown in FIG. 3.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the content delivery service 120. The memory 210 may further include computer program instructions and other information for implementing aspects of the present disclosure. For example, in one embodiment, the memory 210 includes interface software 212 for receiving and processing content requests from the content delivery service 120.

Additionally, the memory 210 includes an encoder component 216 for processing content segments. Additionally, the encoder component 216 can further include a content switching notification component 218 for generating information to inform the content delivery service 120 when switching between different input content streams, additional timing information regarding switching between different content streams and the like. As described above, in some embodiments, a management service 136 may implement the notification functionality and the encoder component 126 may omit such functionality.

Figure 3:
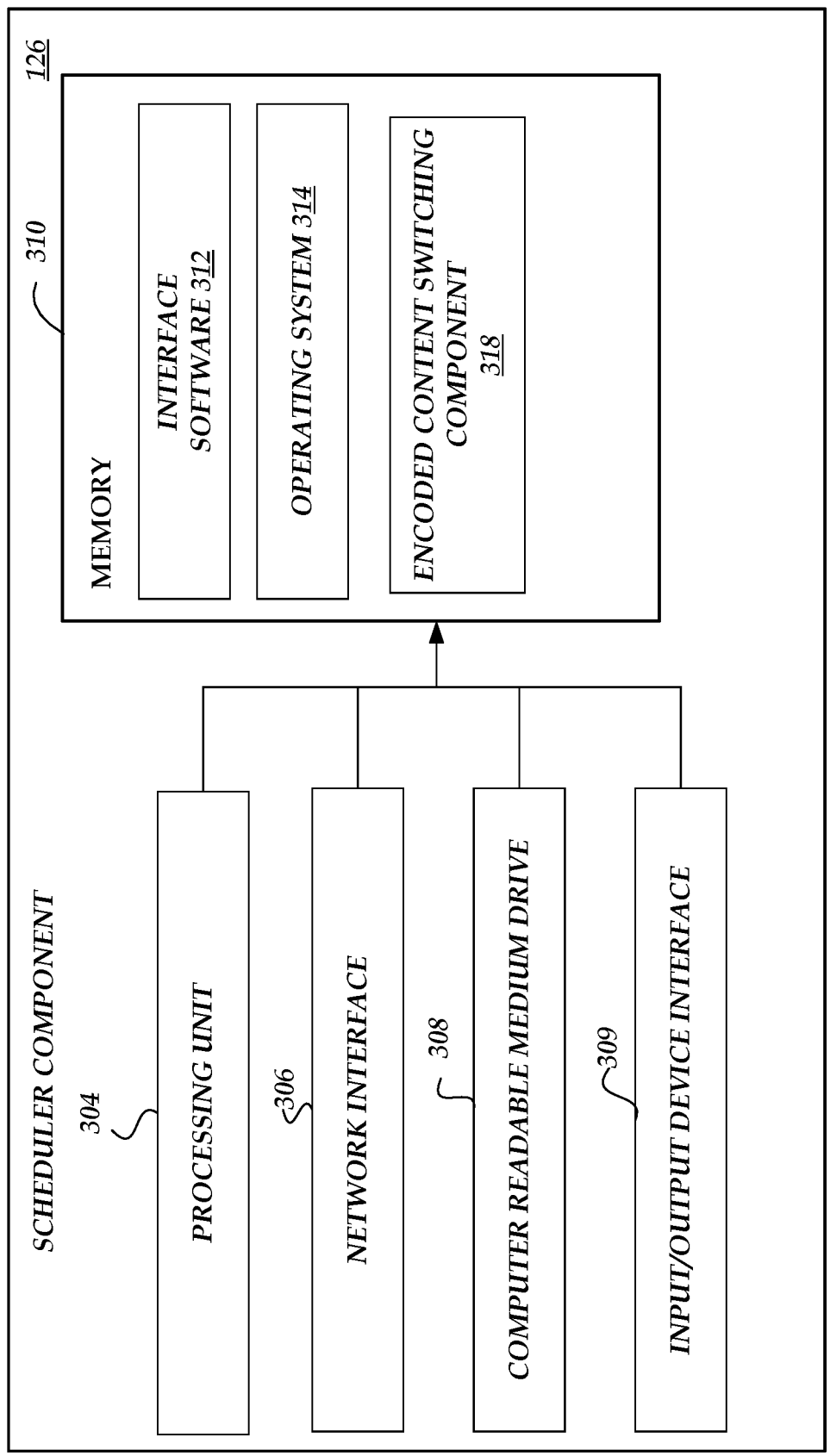
FIG. 3 is a block diagram of illustrative components of a scheduler component configured to manage input content in accordance with an illustrative embodiment.

FIG. 3 depicts one embodiment of an architecture of an illustrative scheduler component 126. As described above, the content delivery service 120 includes multiple ingress 122 and egress components 124 (or nodes) that facilitate intake of decoded content and generating encoded content segments to be outputted by the content delivery service 120. The general architecture of the scheduler component 126 depicted in FIG. 3 includes an arrangement of computer hardware and software components that may be used to implement aspects of the present disclosure. As illustrated, the scheduler component 126 includes a processing unit 304, a network interface 306, a computer readable medium drive 308, an input/output device interface 309, all of which may communicate with one another by way of a communication bus. The components of the scheduler component 126 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the scheduler component 126 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the scheduler component 126. The memory 310 may further include computer program instructions and other information for implementing aspects of the present disclosure. For example, in one embodiment, the memory 310 includes interface software 312 for receiving and processing content requests from requesting entities. Additionally, the scheduler component 126 can further include an input content switching component 318 for processing notifications from the original content provider 130 to switch between a plurality of input content streams as will be described herein. Illustratively, the input content switching component 318 can include the determination of whether a plurality of backup streaming channels are required to facilitate switching between a series of content streams in which the timing to be prepared to switch between channels would interfere or otherwise be restricted based on a previously issued switch command that is being processed. Such embodiments will be illustratively described herein.

Figure 4A:
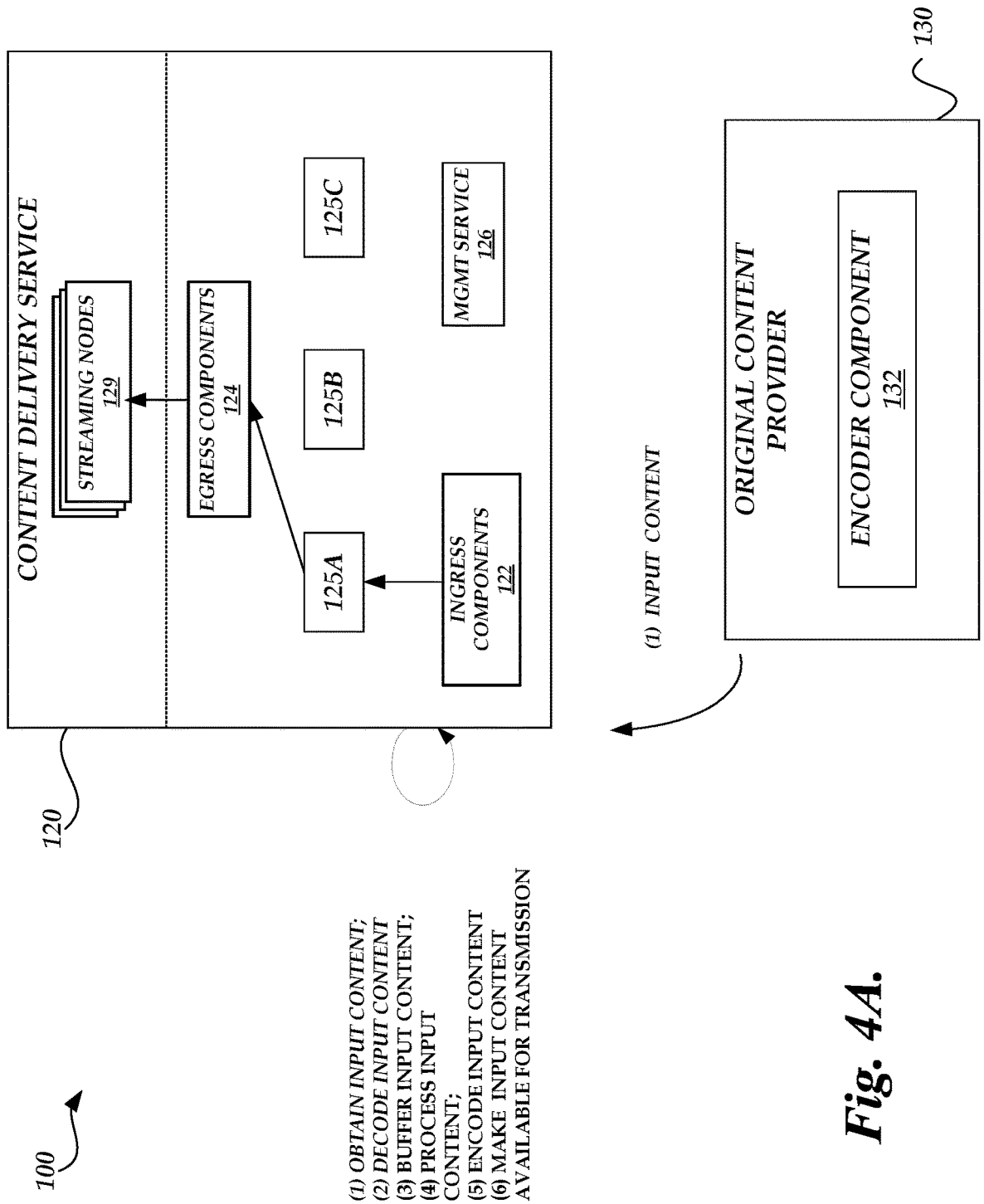
FIGS. 4A, 4B, and 4C are block diagrams of illustrative components of the content delivery environment of FIG. 1 illustrating the interaction related to content delivery service for processing and switching between input content streams utilizing multiple streaming buffers in accordance with an illustrative embodiment.
Figure 4B:
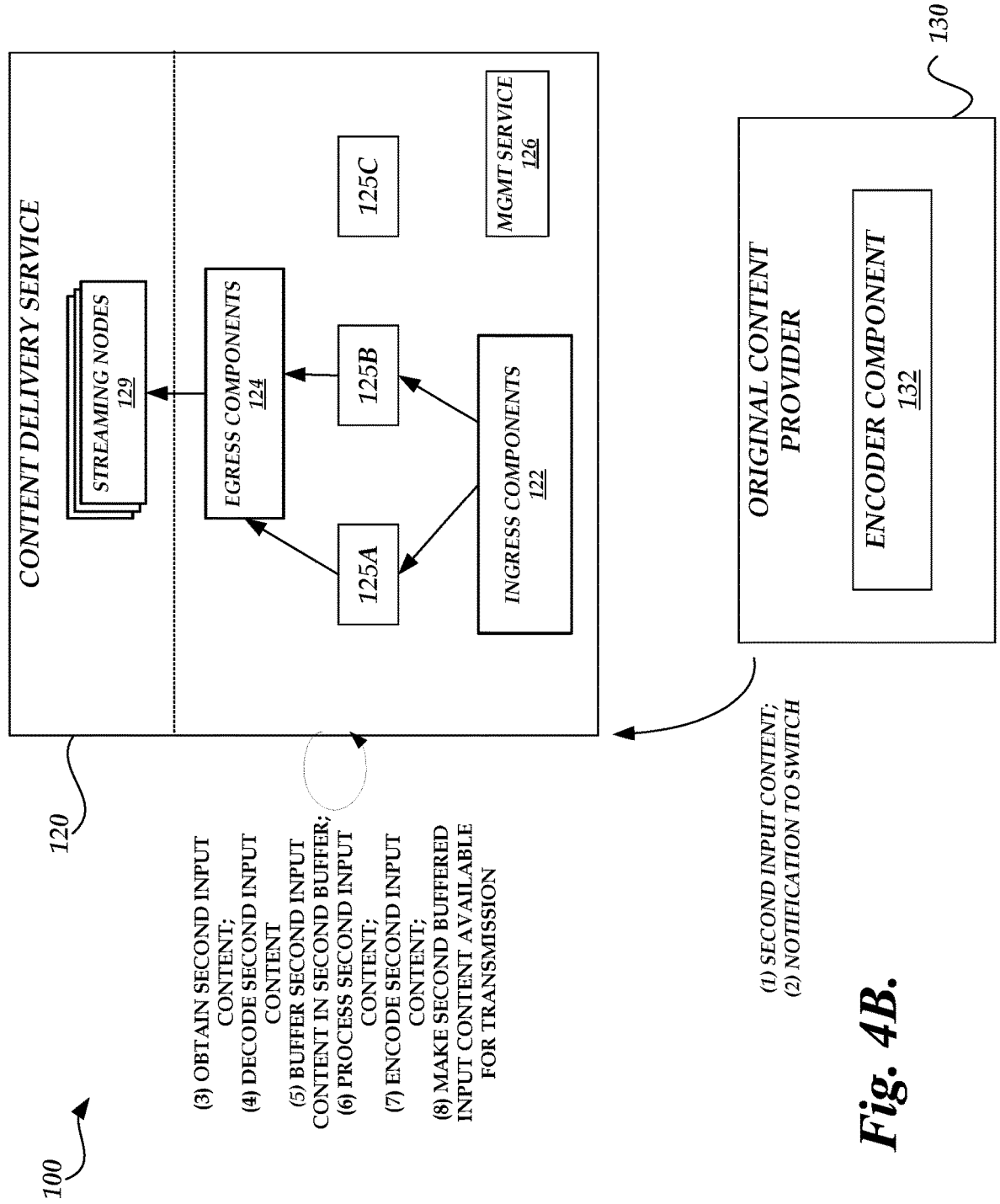
Figure 4C:
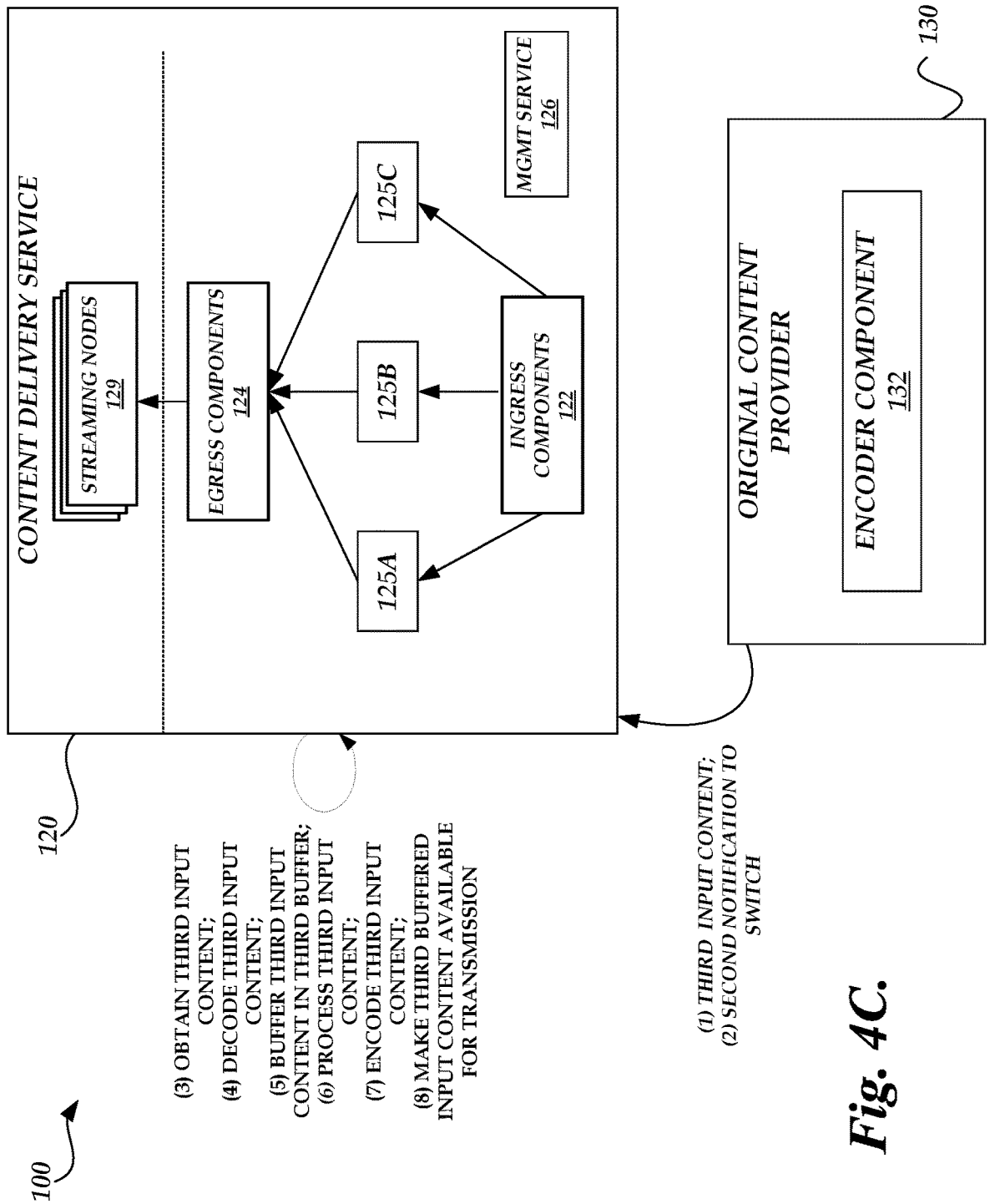

Turning now to FIGS. 4A, 4B and 4C, an illustrative interaction for the processing and switching between multiple content streams provided by the original content provider 130 will be described. With reference first to FIG. 4A, at (1), the original content provider 130 transmits the original encoded content to the content delivery service 120. Illustratively, encoders can be configured with any one of a variety of encoding parameters that are specified in accordance with the encoding format. Such encoding parameters can be varied in accordance with the specifications of the format, which may result in differences in the encoded content such as size of the encoded content, quality of the encoded content, reduction of artifacts, etc.

The encoding parameters can also include synchronization information, such as timestamp or sequence number information that is utilized to keep the encoded content transmitted by the content delivery service 120 synchronized. Illustratively, the format and bitrate for the encoded content corresponds to at least the highest bitrate that will be provided by the content provider service. For purposes of illustration, it is assumed that the transmission of the encoded content corresponds to a first content stream, regardless of whether the content provider 130 may have transmitted previous content streamed or switched to different content streams. Additionally, the source mechanism for the input content from the original can correspond to a variety of mechanisms.

At (2), the content delivery service 120 receives and process the original input content from the original content provider 130. More specifically, at (2), the ingress node 122 stores the original input content and decodes the original input content. At (3), the content delivery service 120 buffers the input content into a first cache that functions as the primary channel for streaming the content.

At (4), the content delivery service 120 process the input content into the first cache that functions as the primary channel for streaming the content. As illustrated in FIG. 4A, the content buffer 125A corresponds to the first channel. Also at (5), the egress nodes 124 encodes the input content and can generate one or more encoded input content streams according to what bitrate and format combinations will be supported. For purposes of aspects of the present application, the specific bitrate or format of the encoded content may vary. At (5), the egress component 124 encodes the buffered input content and make it ready for transmission. Illustratively, the buffered content in the first channel is sufficient to allow the input content to be generated by the egress nodes 124 at a rate that does not create disruptions in the eventual transmission of the content stream to the user devices 102 (not illustrated). At (6), the content delivery service 120 makes the input content available for transmission by providing the encoded input content to the streaming nodes 129.

With reference now to FIG. 4B, in some embodiments, at (1), the original content provider 130 transmits a second encoded content to the content delivery service 120. As described above, encoders can be configured with any one of a variety of encoding parameters that are specified in accordance with the encoding format. The source input from the original content provider may correspond to a variety of mechanisms. Such encoding parameters can be varied in accordance with the specifications of the format, which may result in differences in the encoded content such as size of the encoded content, quality of the encoded content, reduction of artifacts, etc. The encoding parameters can also include synchronization information, such as timestamp or sequence number information that is utilized to keep the encoded content transmitted by the content delivery service 120 synchronized. For purposes of illustration, in one embodiment, the first content stream (FIG. 4A) can correspond to a live content stream, such as a sporting event, news feeds, information from a user device, and the like. At some point, the original content provider 130 can decide to interject some form supplemental content, such as advertisements, explanatory content, corrections, and the like. The first content stream does not have to be completed, but may be interrupted by a switch to the supplemental content.

At (2), the content switching component 218 notifies the original content provider 130 to switch to a second input content. Illustratively, the notification can include timing information, such as time of day, frame reference or other information that will instruct the content delivery service 120 to terminate the transmission of the first content stream and begin the transmission of the second content stream. At (3), the content delivery service obtains the second input content. Still further, the transmission of the second input content and the notifications may be provided by the same component, such as an encoder component 132. Alternatively, the encoder component 132 may provide the second input content and a separate notification, or scheduler node may provide the notification. At (4), the ingress component 122 decodes the second input content.

At (5), the content delivery service 120 processes the input content and buffers the second input content into a second cache that functions as a first backup channel for streaming the input content. As illustrated in FIG. 4B, the content buffer 125A corresponds to the first channel and the content buffer 125B corresponds to the first backup channel or second channel. At (6), the content delivery service process the second input content in the second cache and makes it available to the egress component 124 for encoding at (7). At (8), the content delivery service 120 makes the second content (e.g., the supplemental content) available for transmission by providing the second input content to the streaming nodes 129 in accordance with the notification. Illustratively, the notification provides sufficient time for the content delivery service 120 to fill the second content buffer 125B while the remaining portions of the first content buffer 125A continue to be streamed. Accordingly, once the first content buffer (primary channel) is completed, the content delivery service 120 can transition to the second content buffer in a seamless or substantially seamless manner to mitigate latency or lag.

With reference to FIG. 4C, at (1), the original content provider 130 transmits a third input content to the content delivery service 120. At (2), the content switching component 218 notifies the original content provider 130 to switch to a third input content. For purposes of continued illustration, as described above, the first content stream (FIG. 4A) can correspond to a live content stream, such as a sporting event, news feeds, information from a user device, and the like. Additionally, the source input from the original content provider can correspond to a variety of mechanisms. At some point, the original content provider 130 can decide to interject some form supplemental content, such as advertisements, explanatory content, corrections, and the like (FIG. 4B). The first content stream does not have to be completed, but may be interrupted by a switch to the supplemental content. In still some embodiments, the original content provider 130 can decide to interject a second content stream of supplemental content, such as a successive advertisement, explanatory content, corrections, and the like (FIG. 4C). However, if the length of the second content stream is shorter than the buffering time for third encoded content (e.g., 20 seconds), the first buffer 125A and the second buffer 125B will still in the process of processing the switch notification illustrated in FIG. 4B and content delivery service 120 would otherwise experience a lag until the first content buffer (e.g., the current channel) is completed to begin buffering. Since the second content buffer content is short relative to the buffering of the third content, the content delivery service 120 would not be otherwise have the third content (e.g., the second supplemental content) available. As discussed above, illustratively, the notification can include timing information, such as time of day, frame reference or other information that will instruct the content delivery service 120 to terminate the transmission of the second content stream and begin the transmission of the third content stream.

At (3), the content delivery service 120 obtains the third input content and decodes the received content at (4). At (5), the content delivery service 120 buffers the second input content into a second cache that functions as a second backup channel for streaming the content. Illustratively, the content delivery service 120 can make a determination that the first and second buffers 125A and 125B are still in use and cannot be used for buffering the third content. More specifically, the content delivery service can determine that the length of the second input content is less than the buffering length of the third content. If the length of the second content is longer than the length of buffering the third content, the content delivery service 120 would not need to create or utilize the third buffer 125C (e.g., because the first content buffer would not be utilized once the switch between the first and second content buffer is completed).

As illustrated in FIG. 4C, the content buffer 125A corresponds to the first channel, the content buffer 125B corresponds to the first backup channel or second channel, and the content buffer 125C corresponds to the second backup channel or third channel. At (6), the content delivery service process the third input content and encodes the content stream at (7). At (8), the content delivery service 120 makes the third content (e.g., the second supplemental content) available for transmission by providing the second encoded content to the streaming nodes 129 in accordance with the notification. Illustratively, the notification provides sufficient time for the content delivery service 120 to fill the second content buffer 125B while the remaining portions of the first content buffer 125A continue to be streamed. Accordingly, once the second content buffer (primary channel) is completed, the content delivery service 120 can transition to the third content buffer in a seamless or substantially seamless manner to mitigate latency or lag.

Figure 5:
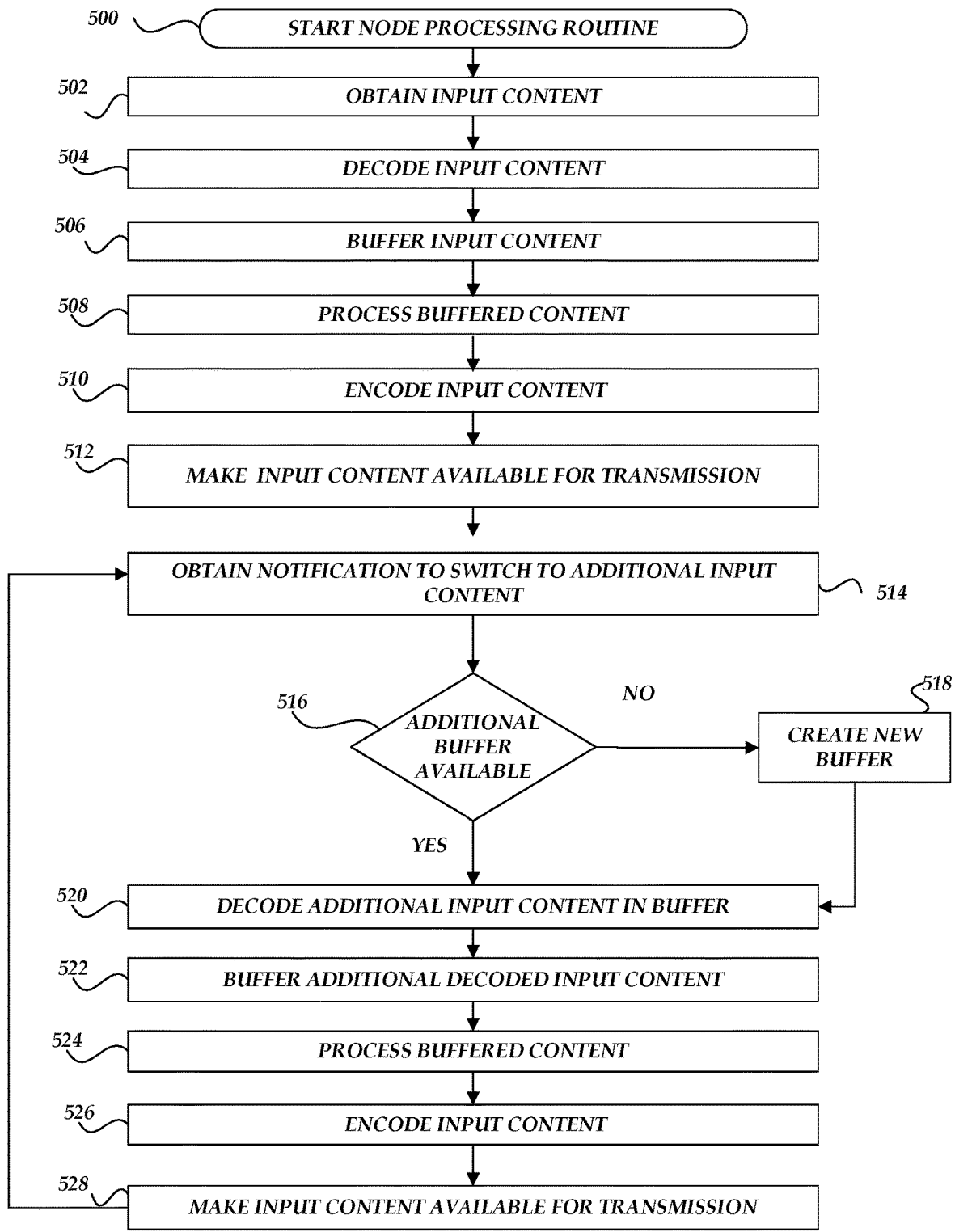
FIG. 5 is a flow diagram illustrative of a processing component routine processing and switching between input content streams utilizing multiple streaming buffers implemented by a content delivery service in accordance with an illustrative embodiment.

Turning now to FIG. 5, a routine 500 utilized by the content delivery service 120 for managing multiple content streams will be described. Illustratively, routine 500 may be implemented by the scheduler component 126 of the content delivery service 120 once the original content provider 130 begins transmitting input content streams to the content delivery service 120.

Blocks 502-512 will be described with regard to an illustrative first content stream received by the content delivery service 120. However, one skilled in the art will appreciate that blocks 502-512 do not have to be an absolute first content stream. Rather, the first content stream is relative to the supplemental content streams, as described below. At block 502, the content delivery 120 obtains input content. At block 504, The egress node 122 decodes the input content according to specified parameters. At block 506, the received input content is buffered. At 508, the content delivery service 120 process the input content. At block 510, the egress node 124 obtains instructions to generate encoded content. As described above, illustratively, the content delivery service 120 can determine the encoding profiles that will be utilized to generate multiple encoded versions of the original content. The encoding profile parameters can include synchronization information, such as timestamp or sequence number information that is utilized to keep the encoded content transmitted by the content delivery service 120 synchronized. Illustratively, the format and bitrate for the input content corresponds to at least the highest bitrate that will be provided by a content delivery service, such as to support adaptive bitrate streaming.

At block 512, the egress node 124 makes the content available for transmission by providing the encoded input content to the streaming nodes 129. Illustratively, the buffered content in the first channel is sufficient to allow the input content to be generated by the egress nodes 124 at a rate that does not create disruptions in the eventual transmission of the content stream to the user devices 102.

Turning now to blocks 514-528, the content delivery service 120 can then continue to stream the first content channel until block 514, when the content delivery service receives a notification to switch content and receives additional content. Illustratively, the notification can include timing information, such as time of day, frame reference or other information that will instruct the content delivery service 120 to terminate the transmission of the first content stream and begin the transmission of the second content stream. At decision block 516, a test is conducted to determine whether a buffer is available to buffer the received content stream and execute the notification. As illustrated in FIG. 4B, if the time of the current channel is sufficiently longer than the buffering of the received content, then the content delivery service 120 can utilize a single backup channel to buffer the received input content. This is illustrated in FIG. 4B between the first content and the second content (e.g., the supplemental content). As illustrated in FIG. 4C, however, if the time of the current channel is not sufficiently longer than the buffering of the received content, then the content delivery service 120 will be switching between three content streams and cannot utilize a single backup channel to buffer the received content. Accordingly, the content delivery service 120 creates and additional backup buffer. This is illustrated in FIG. 4C between the first, second and third content when the length of the second content is not sufficient to allow for processing the switch between the first and second content streams and the subsequent switch between the second and third content streams (e.g., the two supplemental content streams).

Returning to FIG. 5, if at the decision block 516, the time of the current channel is not sufficiently longer than the buffering of the received content, at block 514, the content delivery service 120 creates a new content buffer at block 518. Alternatively, if the time of the current channel is sufficiently longer than the buffering of the received content, the content delivery service 120 proceeds to block 520 to decode additional input content. At block 520, the content delivery service 120 decodes the additional content and buffer the additional content into a cache (either a pre-existing or newly created cache) that functions as a first or second backup channel at block 522.

At block 524, the content delivery service 120 process the input content. At block 526, the content delivery service 120 via the egress nodes 124 encodes the additional input content.

At block 528, the content delivery service 120 makes the content (e.g., the supplemental content) available for transmission by providing the encoded content to the streaming nodes 129 in accordance with the notification. Illustratively, the notification provides sufficient time for the content delivery service 120 to fill the content buffer(s) while the remaining portions of the first content buffer 125A continue to be streamed. Routine 500 returns to block 512 for receipt of additional supplemental content or additional streaming content, such as the resumption of the primary channel or the beginning of new content.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage input content comprising:
one or more computing devices associated with a set of available original content provider computing devices, wherein at least a portion of the original content provider computing devices are configured to provide a plurality of input content streams to a content delivery service and notifications for switching between input content streams;
one or more computing devices associated with a scheduler component of the content delivery service, wherein the scheduler component is configured to:
receive a first original input content stream from the plurality of input content streams provided by the original content provider computing devices;
process the first original input content stream for transmission, wherein processing the first original input content stream for transmission includes storing at least a portion of the first original input content stream in a first buffer and making the buffered first original input content available for transmission;
receive a second input content stream from the plurality of input content streams provided by the original content provider computing devices;
obtain a first notification from the original content provider computing device to switch to the second input content stream;
process the second input content stream for transmission, wherein processing the original input content stream for transmission includes storing at least a portion of the second original input content stream in in a second buffer;
responsive to the obtained first notification and storing of the at least a portion of the second original input content stream in the second buffer, make the second input content in the second buffer available for transmission;
receive a third input content stream from the plurality of input content streams provided by the original content provider computing devices;
obtain a second notification from the original content provider computing device to switch to the third input content stream;
process the third input content stream for transmission, wherein processing includes determining that the first input content in the first buffer and the second input content in the second buffer is still available for transmission and storing at least a portion of the third original input content stream in a third buffer, wherein the first, second and third buffers are different; and
responsive to the obtained second notification and storing of the at least a portion of the third original input content stream in the third buffer, make the third input content in the third buffer seamlessly available for transmission.

2. The system of claim 1, wherein the scheduler component is further configured to determine that the first input content in the first buffer and the second input content in the second buffer is still available for transmission and storing at least a portion of the third original input content stream in the first buffer.

3. The system of claim 1, wherein the scheduler component is further configured to cause the instantiation of the third buffer.

4. The system of claim 1, wherein the scheduler component is configured to determine that the first input content in the first buffer and the second input content in the second buffer is still available by determining that a time length of the second content is less than a time a size of a buffer of the third input content stream.

5. A computer-implemented method to manage input content streaming comprising:
   receiving, by at least one computing device of a content delivery service, two content streams from original content provider computing devices;
   receiving, by the at least one computing device of the content delivery service, a third input content stream from the original content provider computing devices;
   obtaining, by the at least one computing device of the content delivery service, a notification from the original content provider computing device to switch to the third input content stream;
   processing, by the at least one computing device of the content delivery service, the third input content stream for transmission, wherein processing includes determining that buffers from the two content streams from the original content provider computing devices are not available;
   storing at least a portion of the third original input content stream in a third buffer based at least in part on the determining that the buffers from the two content streams are not available; and
   responsive to the obtained notification and storing of the at least a portion of the third original input content stream in the third buffer, making, by the at least one computing device of the content delivery service, the third input content in the third buffer available for transmission to a client device.

6. The computer-implemented method of claim 5, wherein determining that buffers from the two content streams from the original content provider computing devices are not available includes identifying a length of a second of the two content streams.

7. The computer-implemented method of claim 6, wherein determining that buffers from the two content streams from the original content provider computing devices are not available comparing the identified length of the second of the two content streams to a buffer time for the third content stream.

8. The computer-implemented method of claim 7, wherein determining at least one of the two content streams is available for transmission includes determining that the length of the second of the two content streams is less than the buffer time for the third content stream.

9. The computer-implemented method of claim 7, wherein determining at least one of the two content streams is not available for transmission includes determining that the length of the second of the two content streams is greater than the buffer time for the third content stream.

10. The computer-implemented method of claim 5 further comprising subsequent to receiving, by the at least one computing device of the content delivery service, the two input content streams from original content provider computing devices, receiving a notification to switch between a first and a second of the two input content streams.

11. The computer-implemented method of claim 10 further comprising making the second of the two input content stream available responsive to the received notification to switch.

12. The computer-implemented method of claim 11, wherein obtaining the notification from the original content provider computing device to switch to the third input content stream includes obtaining the notification while making the second of the two content streams.

13. The computer-implemented method of claim 5, wherein the notification includes timing information to terminate transmission of a current content stream.

14. The computer-implemented method of claim 5, wherein obtaining, by the at least one computing device of the content delivery service, the notification from the original content provider computing device to switch to the third input content stream from a scheduler component associated with the original content provider.

15. The computer-implemented method of claim 5, wherein making, by the at least one computing device of the content delivery service, the third input content in the third buffer available for transmission to the client device includes making the third input content in the third buffer available for multiplexing and encoding.

16. A computer-implemented method to manage seamless transmission of input content streaming comprising:
   receiving, by at least one computing device of a content delivery service, a first primary content stream and a first supplemental content stream from original content provider computing devices;
   processing, by the at least one computing device of the content delivery service, the first primary content stream and the first supplemental content stream to make the content available for transmission to a client device;
   obtaining, by the at least one computing device of the content delivery service, a notification from the original content provider computing device to switch to an additional supplemental content stream;
   processing, by the at least one computing device of the content delivery service, the additional supplemental content stream for transmission, wherein processing includes determining that buffers from the first primary content stream and the first supplemental content stream are in use;
   storing at least a portion of the additional supplemental content stream in a third buffer based at least in part on the determining that the buffers from the two content streams are not available; and
   responsive to the obtained notification and storing of the at least a portion of the additional supplemental content in the third buffer, seamlessly making, by the at least one computing device of the content delivery service, the additional supplemental content in the third buffer available for transmission to the client device.

17. The computer-implemented method of claim 16, wherein determining that buffers associated with the first primary content stream and the first supplemental content stream are in use includes identifying a length of the first supplemental content.

18. The computer-implemented method of claim 17, wherein determining that buffers associated with the first primary content stream and the first supplemental content stream are in use includes comparing the identified length of the first supplemental content.

19. The computer-implemented method of claim 18, wherein determining that buffers associated with the first primary content stream and the first supplemental content stream are in use includes determining that the length of the first supplemental content stream is less than the buffer time for the additional supplemental content stream.

20. The computer-implemented method of claim 18, wherein determining that buffers associated with the first primary content stream and the first supplemental content stream are in use includes determining that the length of the first primary content stream is less than the buffer time for the additional supplemental content stream.

21. The computer-implemented method of claim 16, wherein the obtained notification is a second notification, and the method further comprising subsequent to receiving, at the at least one computing device of the content delivery service, the first primary content stream and the first supplemental content stream are in use, receiving a first notification to switch between the first primary content stream and the first supplemental content stream when the first primary content stream and the first supplemental content stream are in use.

22. The computer-implemented method of claim 16, wherein obtaining, by the at least one computing device of the content delivery service, the notification from the original content provider computing device to seamlessly switch to the additional supplemental content stream includes receiving the notification from an encoder associated with the original content provider.

\* \* \* \* \*